A. BUREN.
BELT CLAMP.
APPLICATION FILED OCT. 13, 1916.
1,236,261.
Patented Aug. 7, 1917.
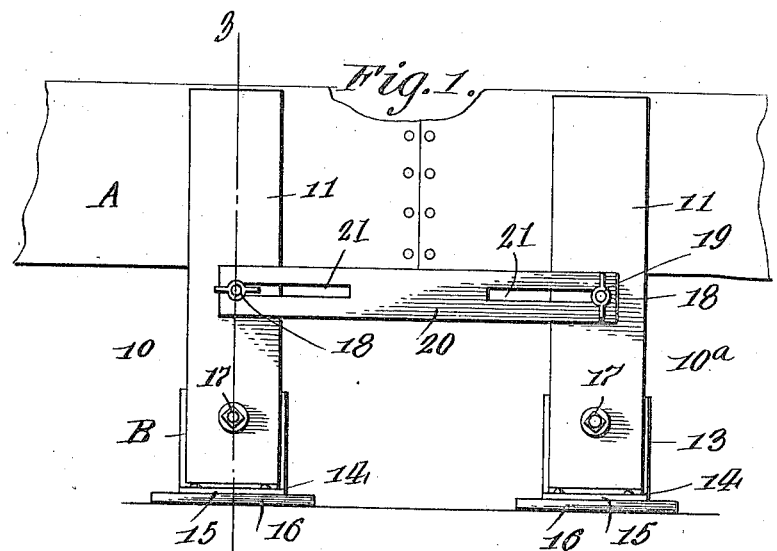
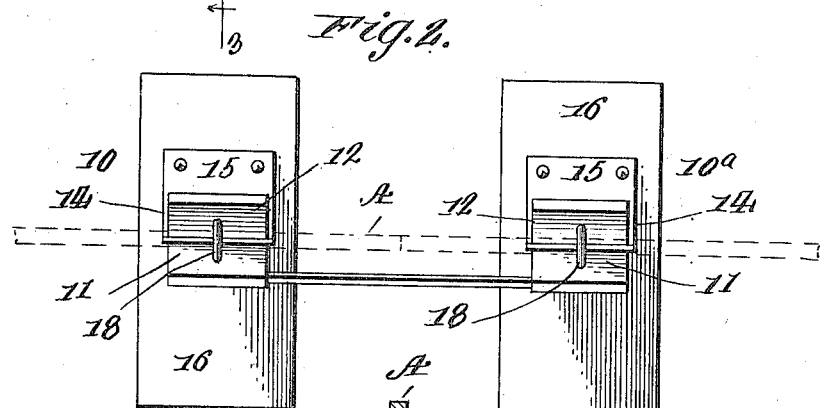
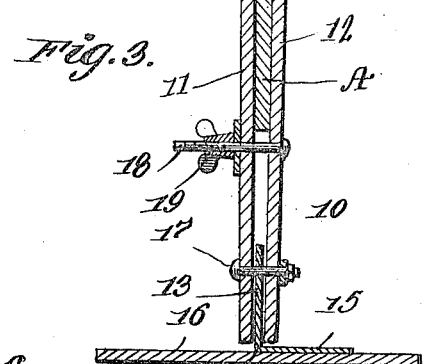
WITNESSES
Guy M. Spring
INVENTOR
Arthur Buren
BY
ATTORNEY

UNITED STATES PATENT OFFICE.

ARTHUR BUREN, OF CULLOM, ILLINOIS.

BELT-CLAMP.

1,236,261.  Specification of Letters Patent.  Patented Aug. 7, 1917.

Application filed October 13, 1916. Serial No. 125,500.

*To all whom it may concern:*

Be it known that I, ARTHUR BUREN, a citizen of the United States, residing at Cullom, in the county of Livingston and State of Illinois, have invented certain new and useful Improvements in Belt-Clamps, of which the following is a specification.

This invention relates to belt clamps, and has for its object to provide a device for gripping the two ends of a belt and holding them firmly in position while the ends are being laced up.

A further object of the invention is to provide a belt clamp for the purpose described which consists of few parts, being simple in construction, and which may be made cheaply and repaired when, through any cause, parts of the device become worn or broken.

With the above as the principal objects in view the invention consists of the novel construction and arrangement of parts hereinafter described, pointed out in the claims, and illustrated in the accompanying drawings, in which—

Figure 1 is an elevation of the complete belt clamp in position for use,

Fig. 2 is a top plan view of the same, and

Fig. 3 is a vertical cross sectional view on the line 3—3 of Fig. 1.

In the drawings, 10 and $10^a$ indicate two vise-like members each comprising two flat plate-like members 11 and 12 that together form the jaws of a vise or clamp, the lower ends of said plates being placed against the opposite faces of the upstanding side 13 of an angle plate 14, the horizontal side 15 of which is bolted to a base plate 16. Connecting the plates 11 and 12 to the angle plate 14 is a threaded bolt 17 headed on one end and provided with a nut and washer on the opposite end.

At a suitable point between the bolt 17 and the top of the plates 11 and 12, said plates are perforated to receive a clamping bolt 18 having a head on one end and provided on its threaded end with a thumb nut 19, by means of which the upper ends of the plates are drawn together for the purpose of clamping therebetween one end of a belt A.

The device $10^a$ is constructed in a similar manner to the vise 10 and the two are connected together by a cross bar 20, each end of which is longitudinally slotted as at 21 and through the respective slots are passed the clamping bolts 18 of the two jaws 10 and $10^a$ and when the nuts 19 are tightened on the jaws, the bar 20 is also rigidly secured thereto and the jaws held at the desired distance apart.

In using this device to lace the ends of a belt, one of said ends is placed between the plates 11 and 12 of the clamp 10 and the other end between similar plates of the clamp or vise $10^a$, the extremities of said belt ends projecting beyond the two jaws toward each other as shown in Figs. 1 and 2. While holding the jaws of one or both clamps tightly upon the belt the two vises are brought together until the ends of the belt are in proper relative position to be laced, whereupon the thumb nuts 19 are tightened to cause the jaws of each vise to firmly grip its belt end and also to rigidly secure the ends of the connecting bar 20 to the two vises, thereby holding the ends of the belt in correct position to be laced. The base plates 16 form rigid and firm supports for the jaws and the angle plates 14 provide suitable means for mounting the plates 11 and 12 on the base plates.

What I claim is:

1. A belt clamp comprising two vises each mounted upon an independently movable base, clamping means for causing the jaws of each vise to grip the end of a belt, and an adjustable connecting link between said vises having slotted ends to engage said clamping means and be held thereby for maintaining the vises at a predetermined distance apart.

2. A belt clamp comprising two vises each formed of a pair of straight plates connected at one end to an angle plate mounted upon a supporting base plate, a clamping bolt extending between said plates, a thumb nut for causing said plates to grip the end of a belt, and a connecting bar having slotted ends movable on said clamping bolt and fixed by said thumb nut for adjustably securing two of said vises in position to maintain the ends of a belt at a predetermined distance apart.

In testimony whereof I affix my signature in presence of two witnesses.

ARTHUR BUREN.

Witnesses:
 ELLEN BUREN,
 JAMES HILL.